United States Patent
Suzuki et al.

(10) Patent No.: US 8,340,871 B2
(45) Date of Patent: Dec. 25, 2012

(54) VEHICLE STEERING CONTROL DEVICE AND METHOD

(75) Inventors: Taku Suzuki, Atsugi (JP); Takaaki Eguchi, Yokohama (JP); Yuwun Chai, Isehara (JP); Hiroyuki Yoshizawa, Yokosuka (JP); Yukinori Nishida, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 326 days.

(21) Appl. No.: 12/668,305

(22) PCT Filed: Jul. 31, 2008

(86) PCT No.: PCT/JP2008/063778
§ 371 (c)(1),
(2), (4) Date: Jan. 8, 2010

(87) PCT Pub. No.: WO2009/017199
PCT Pub. Date: Feb. 5, 2009

(65) Prior Publication Data
US 2010/0138112 A1    Jun. 3, 2010

(30) Foreign Application Priority Data

Aug. 2, 2007 (JP) ................................. 2007-201487
Jul. 3, 2008 (JP) ................................. 2008-174452

(51) Int. Cl.
*B62D 6/00* (2006.01)

(52) U.S. Cl. .......................................................... 701/42
(58) Field of Classification Search .................. 180/446, 180/402; 701/19, 42, 43, 1, 36, 41
See application file for complete search history.

(56) References Cited

U.S. PATENT DOCUMENTS

| | | | |
|---|---|---|---|
| 6,082,482 A | | 7/2000 | Kato et al. |
| 2005/0004731 A1 | | 1/2005 | Bohm et al. |
| 2006/0042859 A1 | * | 3/2006 | Itoh ................................. 180/402 |
| 2008/0251312 A1 | * | 10/2008 | Goto et al. .................... 180/446 |

FOREIGN PATENT DOCUMENTS

| | | |
|---|---|---|
| DE | 10 2005 033 866 A1 | 1/2007 |
| JP | 2003-261052 A | 9/2003 |
| JP | 2004-224238 A | 8/2004 |
| JP | 2006-264374 A | 10/2006 |
| JP | 2007-145207 A | 6/2007 |
| WO | WO 03/013940 A1 | 2/2003 |

* cited by examiner

*Primary Examiner* — Mary Cheung
*Assistant Examiner* — Michael D Lang
(74) *Attorney, Agent, or Firm* — Foley & Lardner LLP

(57) ABSTRACT

Under an automatic turning control, a steering controller defines a value of steering angle set according to a target turning angle of the automatic turning control, as a value of steering angle at which a reaction force is equal to 0. Thereby, the steering controller controls a steering reaction force on the basis of a difference between an actual steering angle and the value of steering angle at which the reaction force is equal to 0.

8 Claims, 15 Drawing Sheets

VEHICLE STEERING CONTROL DEVICE AND METHOD

TECHNICAL FIELD

The present invention relates to a vehicle steering control device having an automatic turning control function.

BACKGROUND ART

When an automatic turning control for automatically controlling a turning angle of a steering road-wheel(s) irrespective of an operation of a steering wheel, e.g. a lane keeping control, is performed, a steering angle is set in dependence upon the turning angle of the steering road-wheel in a vehicle steering control device of earlier technology (for example, see the following Patent Document 1). Thereby, a mismatch between the steering angle and a vehicle behavior is avoided to suppress uncomfortable feeling which is given to a driver.

Patent Document 1: Japanese Patent Application Publication No. 2006-264374

SUMMARY OF THE INVENTION

However, in the above-mentioned earlier technology, the steering wheel always receives a road-surface reaction force which is generated. At the same time, the steering wheel always receives a torque for balancing out this road-surface reaction force, in order to maintain the steering angle set depending on the turning angle of the steering road-wheel. Hence, for example, when the driver conducts a minute steering operation (manipulation) such as a correction steering operation during the automatic turning control, a great force is necessary for the driver so that the driver feels that the steering wheel is restrained. There has been such a problem in the earlier technology.

By focusing on the above-mentioned problem, it is an object of the present invention to provide a steering control device or method for a vehicle, devised to be capable of preventing the driver from feeling the restraint on the steering wheel during the automatic turning control.

To attain the above-mentioned object, according to one aspect of the present invention; a steering reaction force to be applied to a steering wheel is controlled by defining a value of steering angle at which the steering reaction force is equal to 0, as a value of steering angle at a time of straight running of vehicle, under a normal control; and the steering reaction force is controlled also by defining a value of steering angle set according to a target turning angle of automatic turning, as the value of steering angle at which the steering reaction force is equal to 0, under an automatic turning control.

DETAILED DESCRIPTION OF THE INVENTION

Best mode for carrying out the present invention will be explained below based on respective embodiments.

First Embodiment

At first, a configuration will now be explained.

Figure 1:
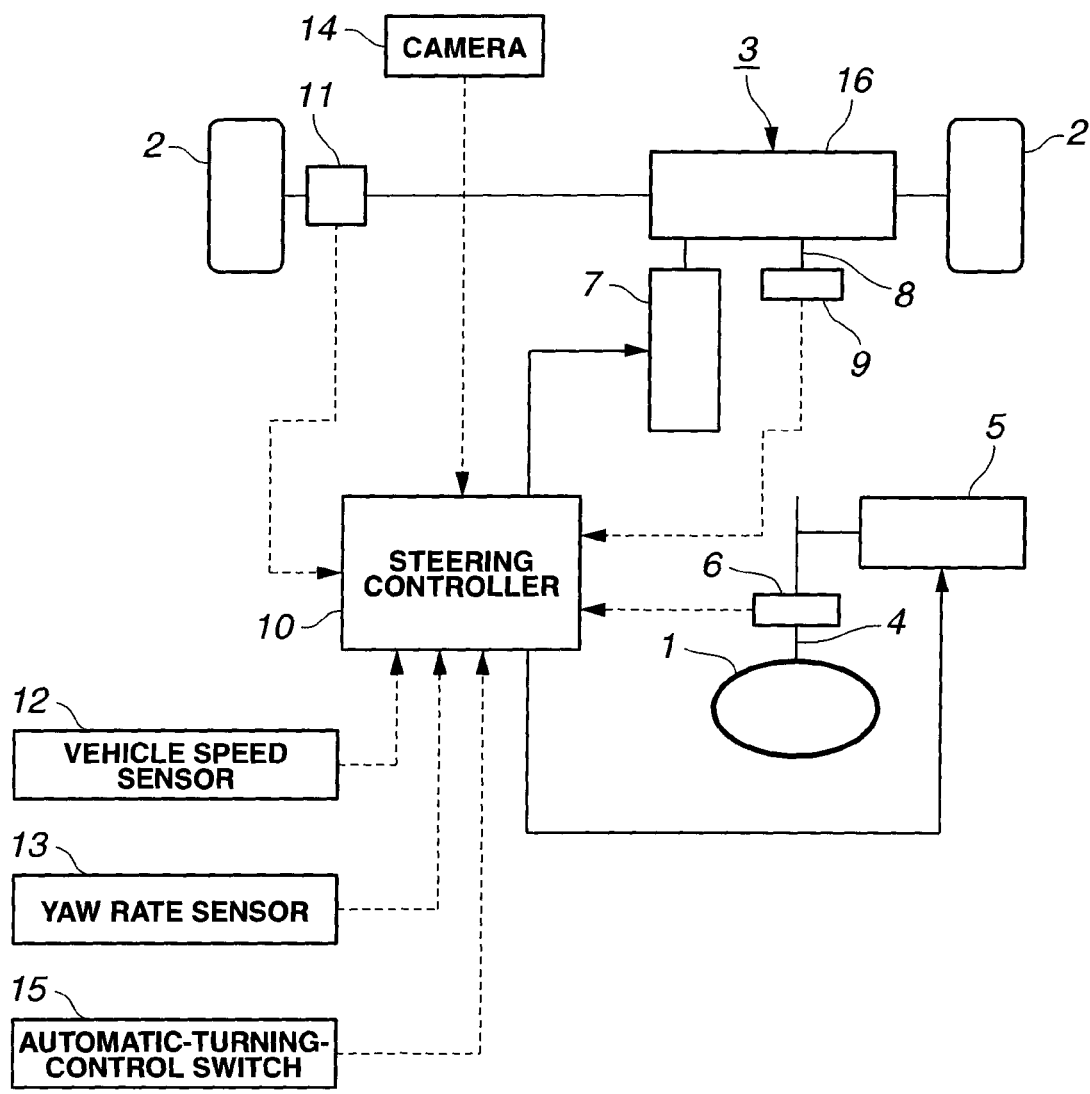
FIG. 1 A schematic configuration view of a steer-by-wire system to which a vehicle steering control device of a first embodiment according to the present invention has been applied.

FIG. 1 is a schematic configuration view of a steer-by-wire system to which a vehicle steering control device of a first embodiment according to the present invention has been applied. That is, the vehicle steering control device in the first embodiment is a so-called steer-by-wire (SBW) system in which a steering wheel 1 is mechanically disconnected or detached from a turning mechanism 3 for tuning front road-wheels (steering road-wheels) 2, 2.

A column shaft 4 supporting the steering wheel 1 is provided with a reaction-force motor (reaction-force mechanism) 5 and a steering angle sensor 6. The reaction-force motor 5 functions to apply a steering reaction force to the steering wheel 1. The steering angle sensor 6 functions to detect a rotation angle of the column shaft 4, as a steering angle which is a rotation angle of steering wheel 1 relative to a straight running state. The turning mechanism 3 is provided with a turning motor 7 and a turning angle sensor 9. The turning motor 7 functions to apply a turning torque for turning the front road-wheels (steering road-wheels) 2, 2, to the turning mechanism 3. The turning angle sensor 9 functions to detect a rotation angle of a pinion shaft 8, as a turning angle which is a rotation angle of front road-wheels 2, 2 relative to the straight running state. The pinion shaft 8 is mechanically connected through a rack 16 with the front road-wheels 2, 2. A rotation of the pinion shaft 8 moves the rack 16 in its axial direction so that the front road-wheels 2, 2 are turned. Therefore, the turning angle can be detected by sensing the rotation angle of pinion shaft 8.

The reaction-force motor 5 and the turning motor 7 are controlled by a steering controller (reaction-force control section or means) 10. The steering controller 10 receives the steering angle derived from the steering angle sensor 6 and the turning angle derived from the turning angle sensor 9. In addition, the steering controller 10 receives a turning reaction force derived from a rack axial-force sensor (turning reaction-force detecting section or means) 11, a vehicle speed (vehicle-body speed) derived from a vehicle speed sensor 12, a yaw rate derived from a yaw rate sensor 13, a pickup image derived from a camera 14, and an automatic-turning-control selecting signal derived from an automatic-turning-control switch 15 (hereinafter referred to as, SW). The rack axial-force sensor 11 functions to detect a force inputted in the axial direction of rack 16 from the front road-wheels 2, 2.

The automatic-turning-control switch 15 is a switch for selecting an automatic turning control of lane keeping control by means of on/off operation of the driver (i.e., steering-wheel operator). The steering controller 10 carries out a normal control when an off-signal is being outputted from the automatic-turning-control switch 15. This normal control means a general SBW control. That is, in this normal control; a target turning angle (first target turning angle) is set according to the steering angle of steering wheel 1 and the vehicle speed, and then, the front road-wheels 2, 2 are turned by driving the turning motor 7 so as to obtain the set first target turning angle. At the same time, the steering reaction force is applied to the steering wheel 1 by driving the reaction-force motor 5 by use of a torque corresponding to the turning reaction force (road-surface reaction force) detected by the rack axial-force sensor 11.

The first target turning angle is set by a relation between the steering angle and the turning angle which are based on a steering gear ratio (ratio of the steering angle to the turning angle). The steering gear ratio is varied according to the vehicle speed. For example, a cornering performance of vehicle is enhanced by lowering the steering gear ratio (i.e., by reducing the steering angle relative to the turning angle) in a low vehicle-speed region, and a running stability is enhanced by enlarging the steering gear ratio (i.e., by enlarging the ratio of the steering angle to the turning angle) in a high vehicle-speed region. Moreover, the steering reaction force is set by defining the steering angle given at the time of straight running, as a minimum reaction-force position (for the steering reaction force), because the turning reaction force according to the turning angle takes its minimum value at the time of straight running. The steering reaction force has a characteristic in which the steering reaction force becomes greater as the turning reaction force becomes greater.

On the other hand, when an on-signal is being outputted from the automatic-turning-control switch 15, the steering controller 10 carries out the automatic turning control until a predetermined release (cancel) condition is satisfied. This automatic turning control automatically turns the front road-wheels 2, 2 irrespective of a driver's manipulation of steering wheel 1. According to the present invention, this automatic turning control means a control for automatically turning the front road-wheels 2, 2 according to a situation, such as the lane keeping control. In the lane keeping control; a lane mark (lane markings) ahead of the vehicle is recognized by the camera 14, and a target turning angle (second target turning angle) of the front road-wheels 2, 2 is set to cause the host vehicle to be maintained within a lane. Thereby, the front road-wheels 2, 2 are automatically turned by driving the turning motor 7 so as to bring the turning angle of front road-wheels 2, 2 to the set target turning angle. In the following explanations, the above-mentioned target turning angle under the normal control will be described as "first target turning angle", and the above-mentioned target turning angle under the automatic turning control will be described as "second target turning angle". Moreover, these target turning angles under the normal control and the automatic turning control will be collectively described as "target turning angle".

In the first embodiment, the second target turning angle under the automatic turning control is calculated by adding a target deviation angle to the first target turning angle set according to the steering angle and the vehicle speed. In other words, the target deviation angle is a difference between the second target turning angle of the automatic turning control and the first target turning angle determined from the steering angle and the vehicle speed.

For example, in the lane keeping control of the first embodiment, the target deviation angle is calculated based on the following formula.

Figure 2A:
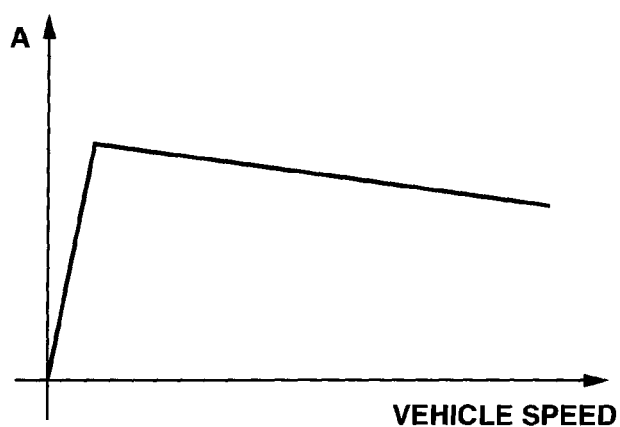
FIG. 2A A gain map for a lateral position in a lane keeping control.
Figure 2B:
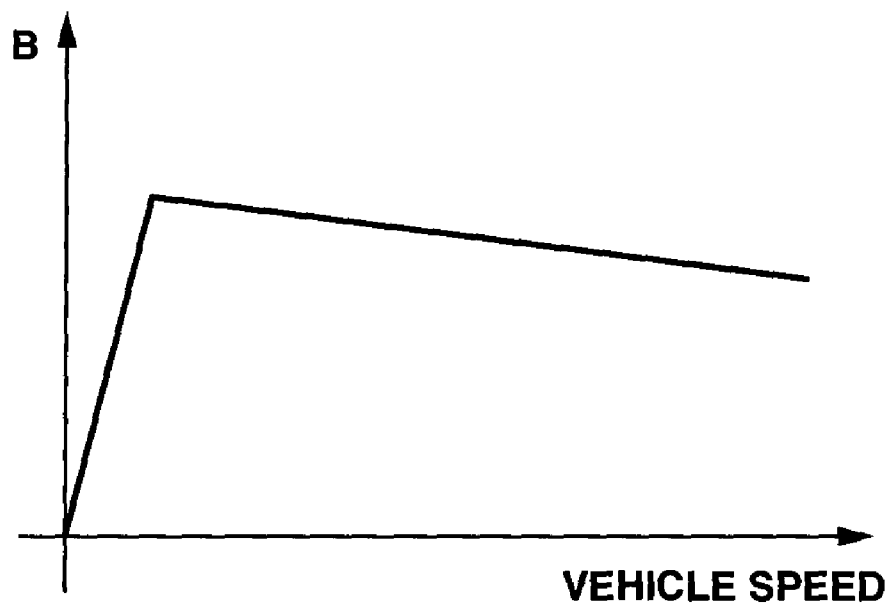
FIG. 2B A gain map for a yaw angle in the lane keeping control.
Figure 2C:
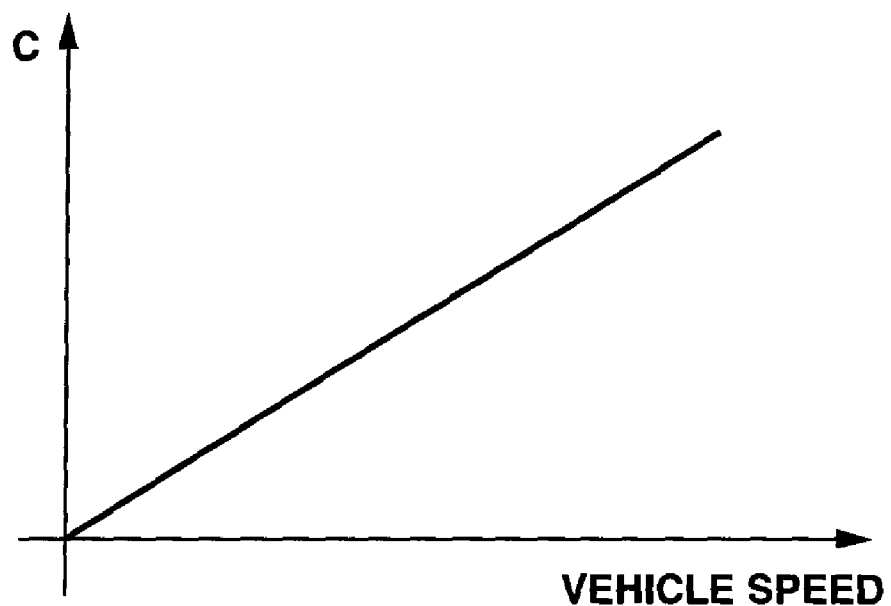
FIG. 2C A gain map for a curvature in the lane keeping control.

Target Deviation Angle=$A$×(Lateral Position relative to Lane)+$B$×(Yaw Angle relative to Lane)+$C$× (Curvature of Lane)

where A, B and C are gains, and are calculated from gain maps shown in FIGS. 2A to 2C.

That is, in the lane keeping control, the three gains are set for a lateral position relative to the lane, a yaw angle relative to the lane and a curvature of the lane, so that a follow-up degree to the lane is adjusted. These lateral position relative to the lane, yaw angle relative to the lane and curvature of the lane can be detected based on the image taken by the camera 14.

As the release condition of the automatic turning control, a steering interaction of the driver, a braking manipulation of the driver and the like can be cited. This steering interaction means a case that an actual steering angle which can be obtained from the steering angle sensor 6 varies greatly from a value of steering angle set depending on the second target turning angle, such as a case of lane change or a case of obstacle avoidance manipulation. That is, the automatic turning control is not released or stopped in a case of a minute steering operation having a degree allowing a straight-running state or cornering state of the vehicle to be maintained, such as correction steering operation (i.e., in a case of a minute steering operation conducted while maintaining a steering state of vehicle). Moreover, a relation between the second target turning angle and "the steering angle set depending on the second target turning angle" is identical with the relation between the steering angle and the turning angle which is determined by the steering gear ratio at the time of normal control. Therefore, "the steering angle set depending on the second target turning angle" can be calculated by multiplying the second target turning angle by the steering gear ratio.

Figure 3:
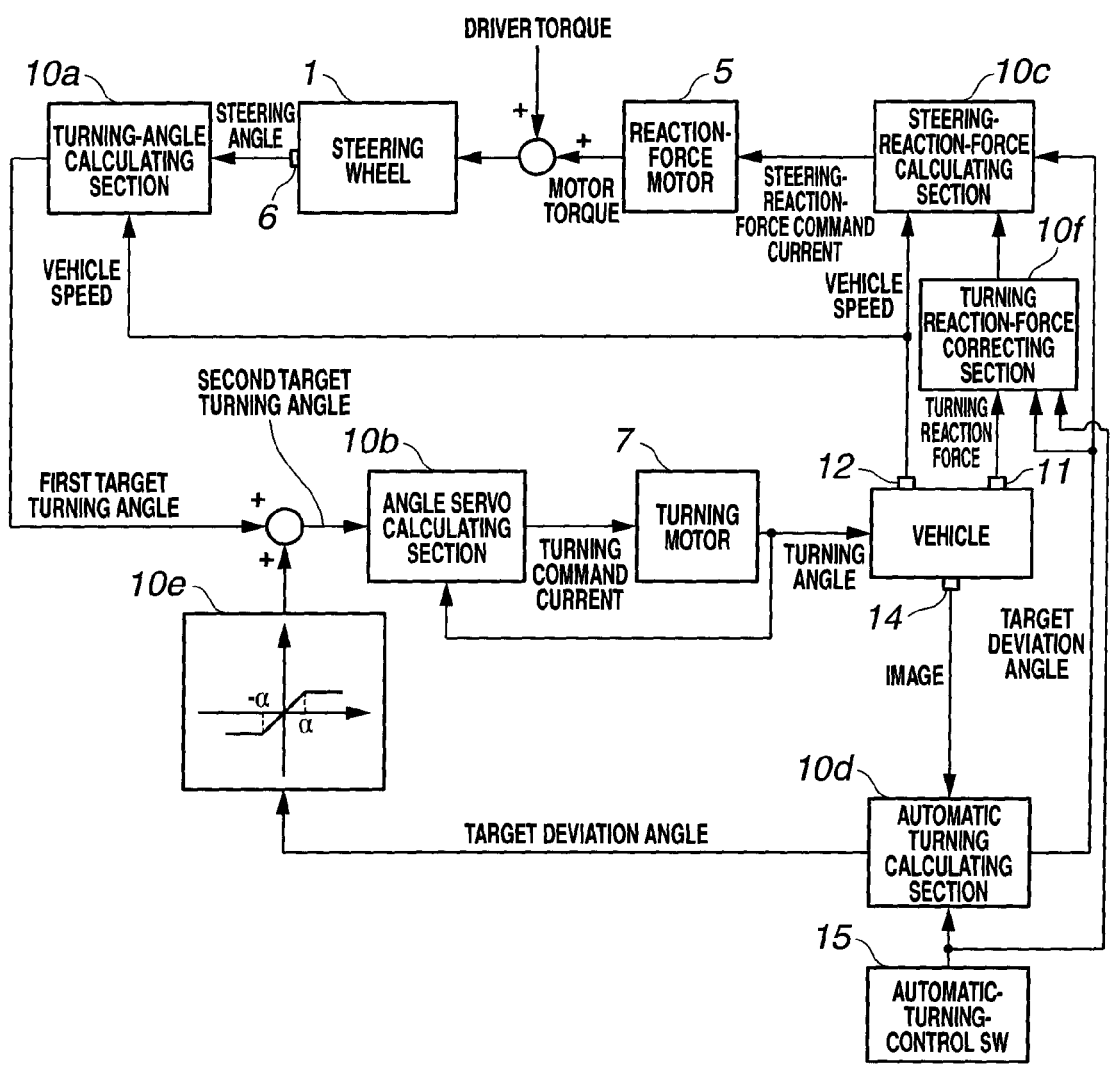
FIG. 3 A control block diagram of a steering controller 10 in the first embodiment.

FIG. 3 is a control block diagram of the steering controller 10 in the first embodiment. As shown in FIG. 3, the steering controller 10 includes a turning-angle calculating section 10a, an angle servo calculating section 10b, a steering-reaction-force calculating section 10c, an automatic turning calculating section 10d, a target-deviation-angle correcting section 10e, and a turning reaction-force correcting section 10f.

The automatic turning calculating section 10d calculates the target deviation angle when carrying out the automatic turning control during which the automatic-turning-control switch 15 is ON. This target deviation angle is the difference between the second target turning angle of automatic turning control and the first target turning angle which is given according to the steering angle and the vehicle speed, as mentioned above. The calculated target deviation angle is outputted respectively to the steering-reaction-force calculating section 10c, the target-deviation-angle correcting section 10e and the turning reaction-force correcting section 10f. Moreover, this automatic turning calculating section 10d does not output the target deviation angle (i.e., outputs a value of 0) under the normal control during which the automatic-turning-control switch 15 is OFF.

Figure 4:
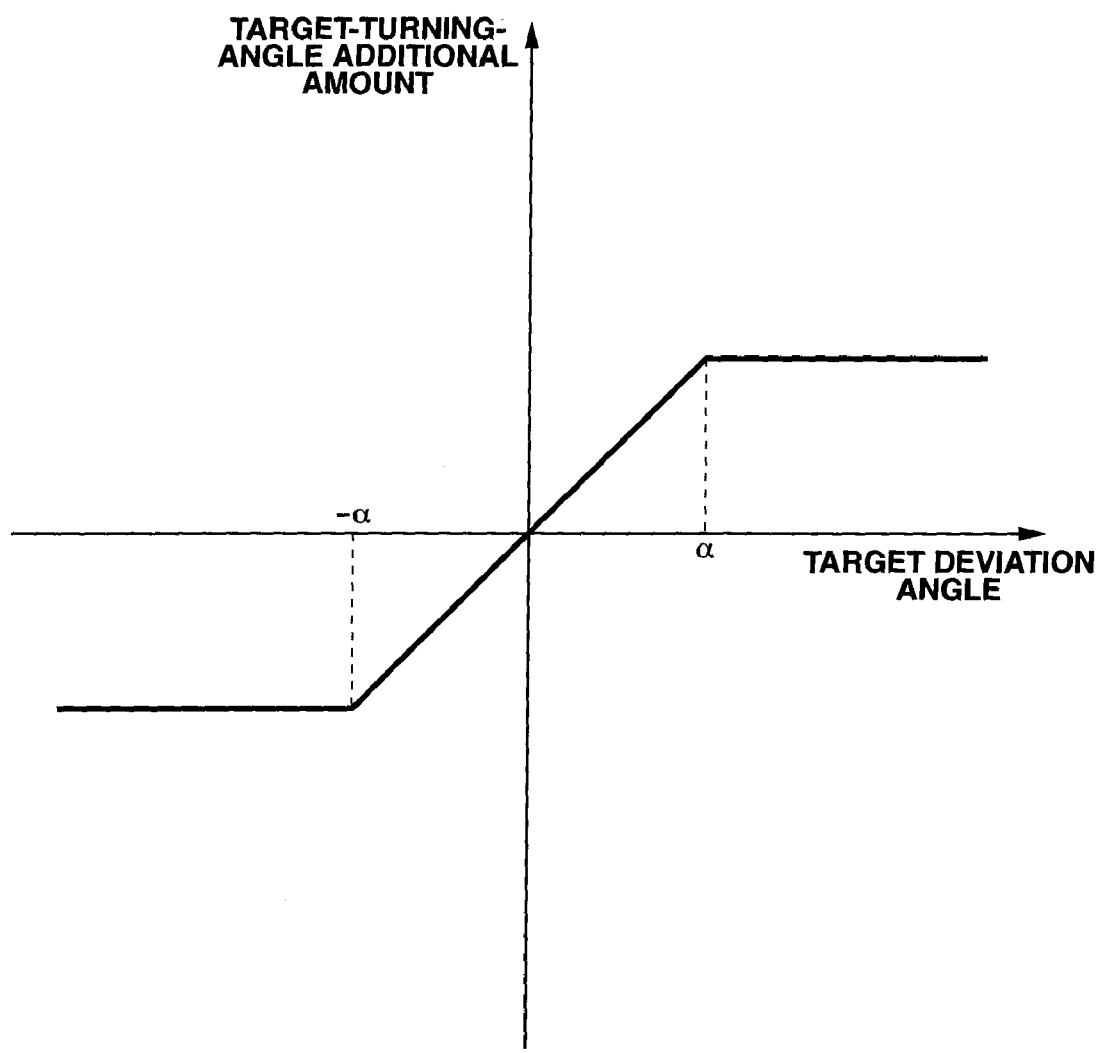
FIG. 4 A setting map for a target-turning-angle additional amount according to a target deviation angle in the first embodiment.

The target-deviation-angle correcting section 10e outputs a target-turning-angle additional amount corresponding to the target deviation angle received from the automatic turning calculating section 10d. This outputted target-turning-angle additional amount is added to the target turning angle outputted from the turning-angle calculating section 10a. As shown in FIG. 4, when an absolute value of the target deviation angle is lower than or equal to a predetermined value |α|, the target-turning-angle additional amount is proportional to this absolute value of target deviation angle. When the absolute value of target deviation angle is greater than the predetermined value |α|, the target-turning-angle additional amount takes a constant value (two constant values). Moreover, when the target deviation angle is equal to 0, namely when the normal control is being carried out in which the automatic-turning-control switch 15 is OFF; the value of 0 is outputted as the target-turning-angle additional amount.

In the first embodiment, a right steering or turning direction as viewed from the driver is defined as a positive (+) direction, and a left steering or turning direction as viewed from the driver is defined as a negative (−) direction.

The turning-angle calculating section 10a sets a target yaw rate of the vehicle in accordance with the steering angle and the vehicle speed, and calculates the first target turning angle for front road-wheels 2, 2 which can achieve this set target yaw rate. The second target turning angle obtained by adding the target-turning-angle additional amount outputted from the target-deviation-angle correcting section 10e to the first target turning angle calculated by the turning-angle calculating section 10a is inputted to the angle servo calculating section 10b. The angle servo calculating section 10b calculates a turning command electric-current for bringing the actual turning angle to the second target turning angle so that the turning motor 7 is controlled by way of servocontrol. As mentioned above, at the time of normal control under which the automatic-turning-control switch 15 is OFF, the target-turning-angle additional amount outputted from the target-deviation-angle correcting section 10e is equal to 0. Therefore, at the time of normal control, the value of first target turning angle is equal to the value of second target turning angle resulting from the sum of the first target turning angle and the target-turning-angle additional amount.

The turning reaction force detected by the rack axial-force sensor 11 is inputted to the turning reaction-force correcting section 10f. When the automatic turning control is being carried out under which the automatic-turning-control switch 15 is ON, the turning reaction-force correcting section 10f outputs a corrected turning reaction force to the steering-reaction-force calculating section 10c. This corrected turning reaction force is obtained by correcting the turning reaction force detected by the rack axial-force sensor 11 so as to remove (cancel) only a steady-state turning reaction force (component) from the turning reaction force detected by the rack axial-force sensor 11. On the other hand, when the normal control is being carried out under which the automatic-turning-control switch 15 is OFF, the turning reaction-force correcting section 10f outputs the turning reaction force detected by the rack axial-force sensor 11 as-is to the steering-reaction-force calculating section 10c. The followings are detailed explanations on these processing in the turning reaction-force correcting section 10f.

Figure 5:
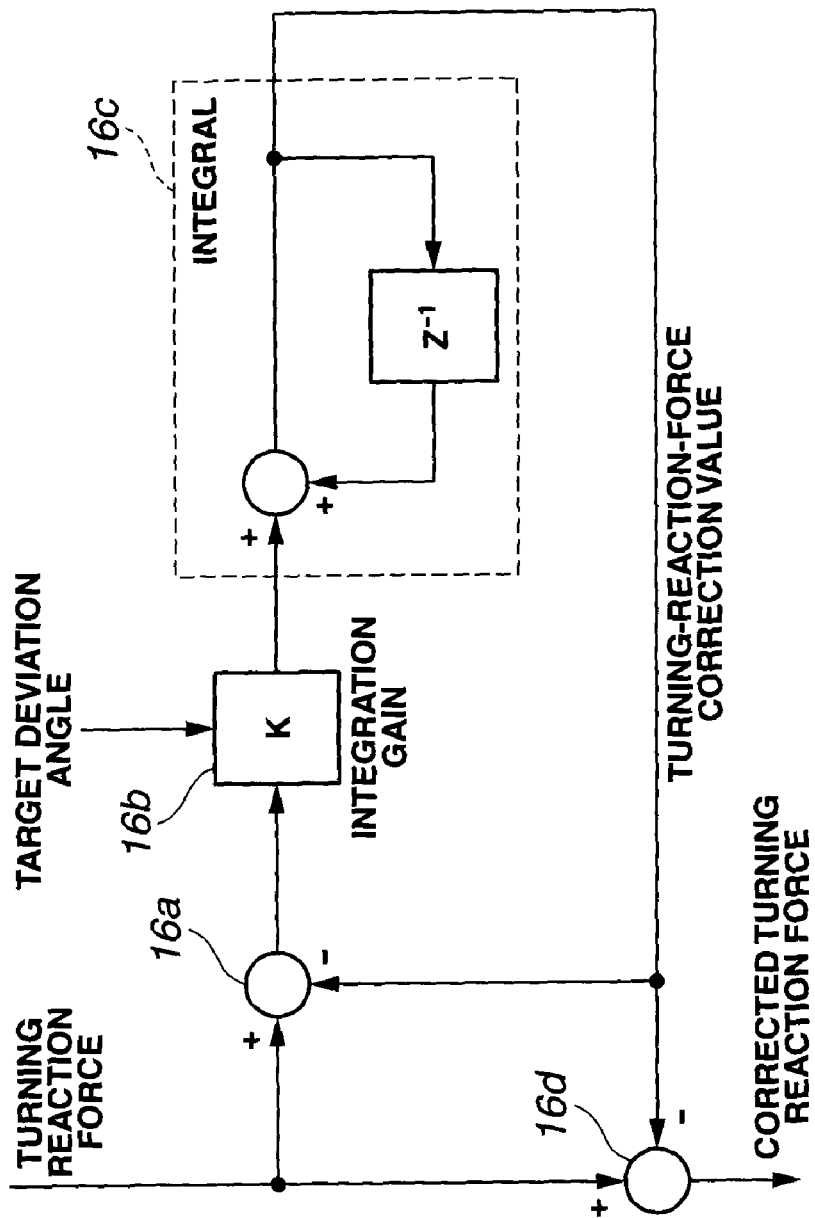
FIG. 5 A block diagram of a turning reaction-force correcting section 10f in the first embodiment.

FIG. 5 is a block diagram of the turning reaction-force correcting section 10f in the first embodiment. The turning reaction-force correcting section 10f includes a subtractor (difference calculator) 16a, a multiplier 16b, an integrator 16c and a subtractor 16d.

The subtractor 16a outputs a difference between the detected turning reaction force and a turning-reaction-force correction value outputted from the integrator 16c, to the multiplier 16b.

The multiplier 16b outputs a value obtained by multiplying this difference by an integration gain K, to the integrator 16c. The integration gain K satisfies the following formula:

$$K = K0 \times K1 (0 \sim 1)$$

where K0 and K1 denote gains.

The multiplier 16b maintains an integration value when the integration gain K is equal to 0 (K=0), and increases an integration rate (integration speed) as the integration gain K is brought closer to 1.

Figure 6:
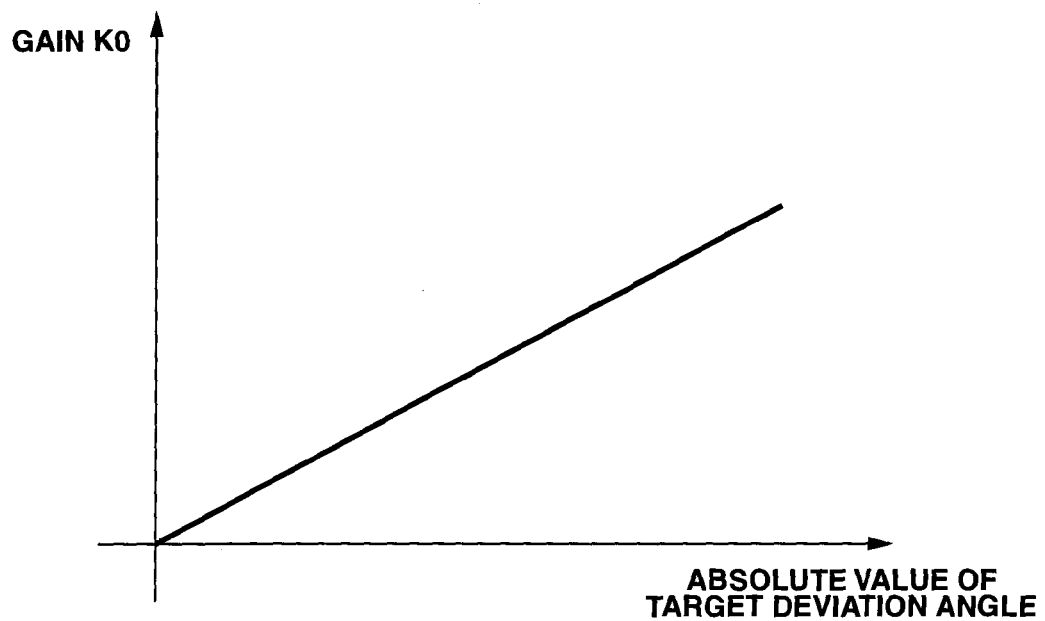
FIG. 6 A setting map for a gain K0 in the first embodiment.
Figure 7:
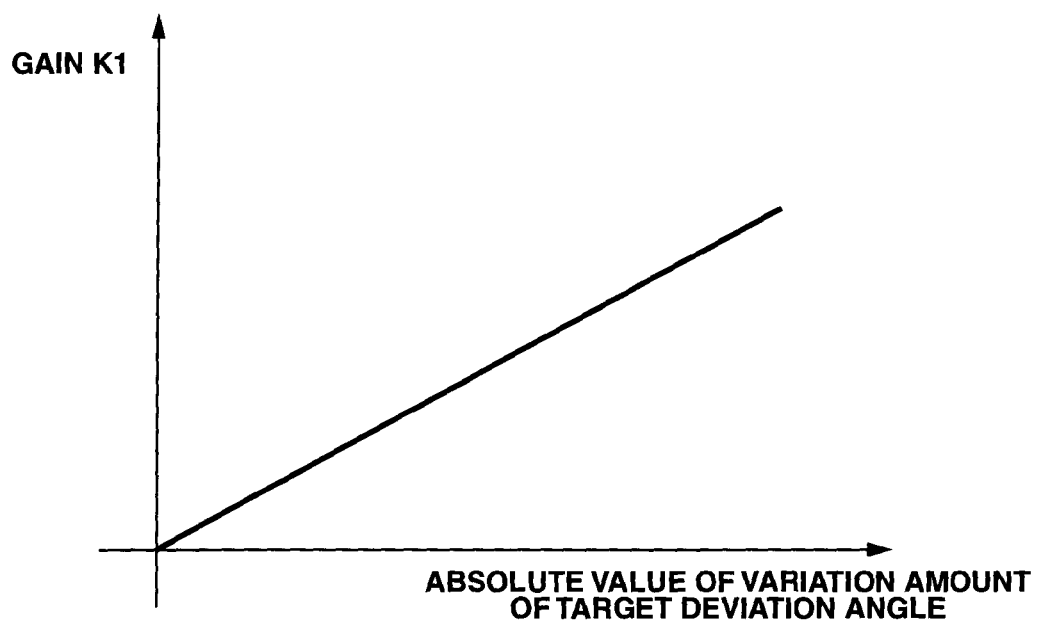
FIG. 7 A setting map for a gain K1 in the first embodiment.

Moreover, as shown in FIG. 6, the gain K0 is equal to 0 when the target deviation angle is equal to 0, and becomes greater as the absolute value of target deviation angle becomes greater. As shown in FIG. 7, the gain K1 is equal to 0 when a variation amount of the target deviation angle is equal to 0, and becomes greater as an absolute value of the variation amount of target deviation angle becomes greater. Accordingly, because the target deviation angle is equal to 0 at the time of normal control, the integration gain K takes 0 (K=0) at the time of normal control.

The integrator 16c outputs the turning-reaction-force correction value obtained by integrating the output of multiplier 16b, to the subtractor 16a and the subtractor 16d.

The subtractor 16d outputs a difference between the detected turning reaction force and the turning-reaction-force correction value, to the steering-reaction-force calculating section 10c.

As understood from the above, under the normal control, the turning-reaction-force correction value is equal to 0 because the gain K is equal to 0 (K=0). Hence, under the normal condition, the turning reaction-force correcting section 10f does not correct the reaction force inputted from the rack axial-force sensor 11, but outputs this reaction force as-is to the steering-reaction-force calculating section 10c.

On the other hand, under the automatic turning control, the turning-reaction-force correction value is calculated according to the gain K because the gain K is set based on the target deviation angle. Thereby, the turning reaction-force correcting section 10f corrects the turning reaction force so as to bring this turning reaction force closer to 0, and outputs the corrected turning reaction force to the steering-reaction-force calculating section 10c. That is, if the inputted turning reaction force is in a steady state, the turning reaction-force correcting section 10f outputs the corrected turning reaction force to the steering-reaction-force calculating section 10c. In other words, a steady reaction force caused due to the turning angle such as a self aligning torque is removed from the inputted turning reaction force; and thereby only a transient reaction force caused due to an asperity (concavity and convexity) of road surface or the like is outputted to the steering-reaction-force calculating section 10c as the corrected turning reaction force.

Figure 8:
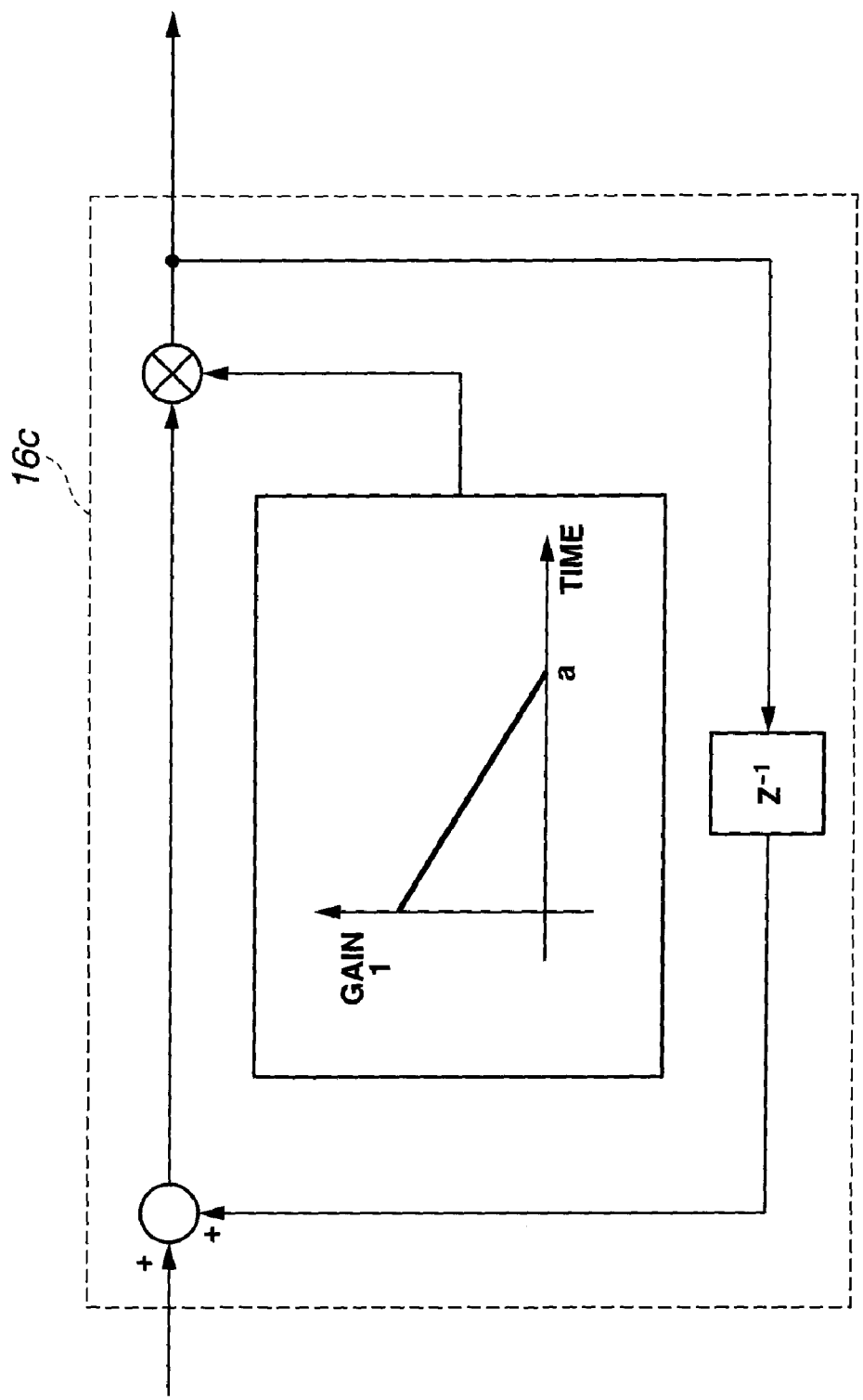
FIG. 8 An explanatory view showing a method of correcting a turning reaction force when switching from an automatic turning control to a normal control, in the first embodiment.

The turning reaction-force correcting section 10f causes the turning-reaction-force correction value to gradually become 0 when the automatic turning control is turned from ON to OFF (at the time of transition from the automatic turning control to the normal control). This can be realized, for example, by providing a function block for gradually reducing the turning-reaction-force correction value outputted from integrator 16c, to an inside of the integrator 16c as shown in FIG. 8. Thereby, the turning-reaction-force correction value can gradually become equal to 0 by use of a time interval "a" which does not give an uncomfortable feeling to the driver, when the automatic turning control is released.

The steering-reaction-force calculating section 10c calculates the target steering reaction force in accordance with the turning reaction force received from the turning reaction-force correcting section 10f, the vehicle speed and the target deviation angle. Then, the steering-reaction-force calculating section 10c calculates a steering-reaction-force command electric-current for reaction-force motor 5 which can obtain the target steering reaction force, and drives the reaction-force motor 5 by using this steering-reaction-force command electric-current. The target steering reaction force is set to be greater as the turning reaction force inputted from the turning reaction-force correcting section 10f becomes greater or as the vehicle speed becomes higher.

Moreover, the steering-reaction-force calculating section 10c applies the steering reaction force on the basis of the absolute value of target deviation angle inputted from the automatic turning calculating section 10d when the absolute value of target deviation angle is greater than the predetermined value |α|. In the steady state, a relation between the first target turning angle and the actual steering angle is corresponding to a present (current) value of the steering gear ratio. Therefore, the configuration in which the steering reaction force is applied based on the absolute value of target deviation angle is equivalent to the configuration in which the steering reaction force is applied according to a difference between the actual steering angle and the value of steering angle set depending on the second target turning angle. Thereby, the steering wheel 1 can be rotated up to the steering angle set depending on the second target turning angle (i.e., up to a value of steering angle determined by multiplying the second target turning angle by the steering gear ratio).

It is noted that "steering wheel 1 is rotated up to the set steering angle" means a process of applying a level of steering reaction force which causes the steering wheel 1 to rotate up to (to satisfy) the set value of steering angle in a case where the driver has lost his hold of the steering wheel 1. Hereinafter, this process is simply expressed as "steering wheel 1 is rotated".

On the other hand, when the absolute value of target deviation angle is lower than or equal to the predetermined value |α|, the steering reaction force based on the absolute value of target deviation angle is forced to become equal to 0. That is, the steering reaction force according to the difference between the actual steering angle and the steering angle set depending on the target turning angle is made to become 0. The predetermined a is a value of target deviation angle (for example, approximately 0.3° in turning angle) which can suppress a variation of vehicle behavior so as not to give the uncomfortable feeling to the driver even if the front road-wheels 2, 2 are turned without rotating the steering wheel 1.

In the first embodiment, the target steering reaction force is set relative to the deviation (difference) Δθ between the actual steering angle and the steering angle set depending on the second target turning angle, as the sum of a derivative term and a stationary term, for example, by using the following formula.

$$\text{Target Steering Reaction Force} = -\left(d \times \frac{d}{dt}\Delta\theta + e \times \Delta\theta\right) \quad \text{[Formula 1]}$$

where d and e denote gains, and d/dt denotes a differential coefficient.

Figure 9A:
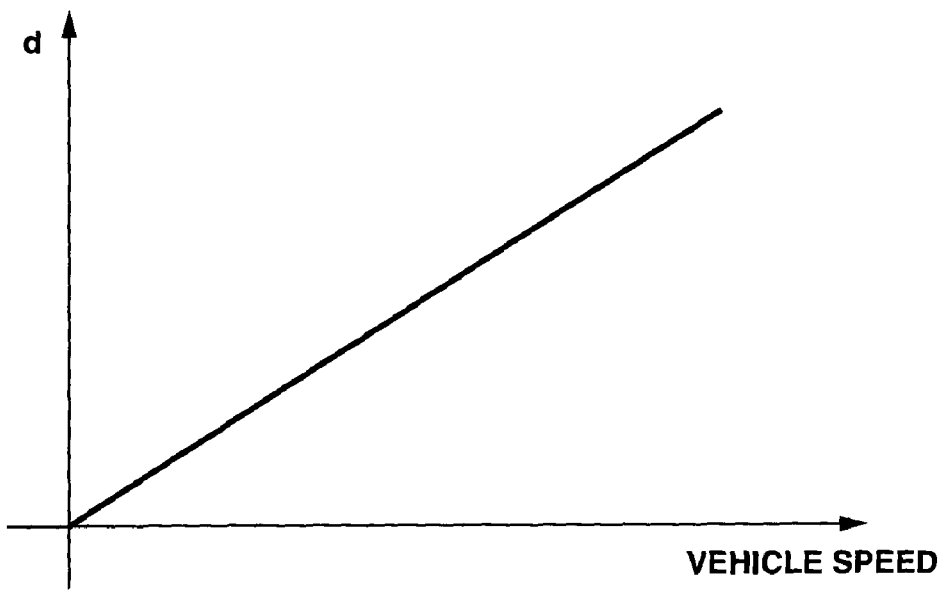
FIG. 9A A setting map for a gain d for a steering reaction force control in the first embodiment.
Figure 9B:
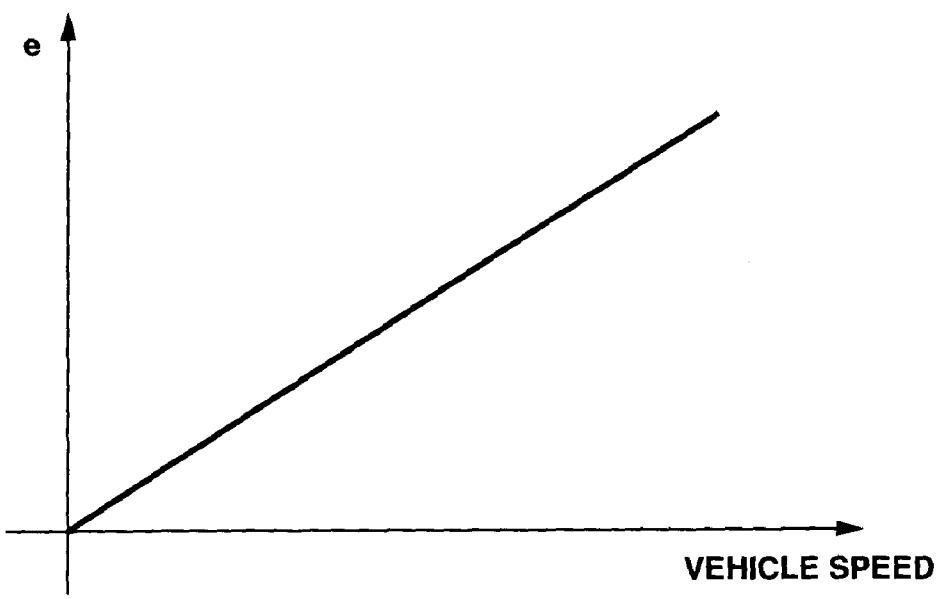
FIG. 9B A setting map for a gain e for the steering reaction force control in the first embodiment.

The gains d and e are calculated referring to maps shown in FIGS. 9A and 9B. As shown in FIGS. 9A and 9B, the gains d and e are set to become greater as the vehicle speed becomes higher. In the formula 1, the steering reaction force has a negative sign since the steering reaction force is a force acting in a direction opposite to the steering direction.

Next, operations in the first embodiment will now be explained.

In general, in a case that an automatic turning control such as the lane keeping control is performed in the so-called SBW system in which a steering wheel is mechanically disconnected from a turning mechanism for tuning front road-wheels, the followings can be cited as methods of reflecting (adapting) the target deviation angle to the turning angle of front road-wheels 2, 2.

1. A steering-reaction-force command electric-current according to the target deviation angle is applied to a reaction-force motor so that a steering wheel is rotated to vary its steering angle by an angle corresponding to the target deviation angle. Thereby, the target deviation angle is reflected to a target turning angle of the turning motor.
2. The target deviation angle is directly added to a target turning angle of a turning motor without rotating a steering wheel.

In the case that the steering-reaction-force command electric-current according to the target deviation angle is applied to the reaction-force motor; the target deviation angle is reflected to the target turning angle to turn the front road-wheels, by automatically rotating the steering wheel. Hence, the turning reaction force derived from a road surface is not transmitted due to the applied steering-reaction-force command electric-current. This brings a feeling of strangeness to the driver.

On the other hand, in the case that the target deviation angle of automatic turning control is directly added to the target turning angle, only the front road-wheels are automatically turned while the steering wheel is not rotated. Hence, the driver needs to recognize a cornering (turn) state of vehicle only from the vehicle behavior. When a large change of vehicle behavior occurs under this state, the driver receives the feeling of strangeness due to a divergence between the steering angle and the vehicle behavior.

Contrary to this, in the first embodiment, only the front road-wheels 2, 2 are turned in accordance with the target deviation angle without rotating the steering wheel 1, when the absolute value of target deviation angle is lower than or equal to the value |α| a whose magnitude does not bring a feeling of strangeness to the driver under the automatic turning control. Moreover in the first embodiment, the steering wheel 1 is rotated to achieve the steering angle set according to the target turning angle when the absolute value of target deviation angle is greater than the value |α| under the automatic turning control.

That is, when the change of vehicle behavior occurs without the rotation of steering wheel 1, a deviation of the steering angle relative to the actual turning angle of front road-wheels 2, 2 is suppressed within a range preventing the uncomfortable feeling of the driver. Therefore, the strangeness feeling due to the inconsistency (mismatch) between the steering angle and the vehicle behavior can be prevented from occurring.

Moreover, at the time of automatic turning control in this embodiment; no reaction force is applied to the steering wheel 1 in the case where the absolute value of target deviation angle is lower than or equal to the value |α|, and only a value of reaction force depending on the target deviation angle is applied to the steering wheel 1 in the case where the absolute value of target deviation angle is greater than the value |α|. That is, under the automatic turning control, only two of a component of steering reaction force which is based on the difference between the steering angle corresponding to the present (current) turning angle and the steering angle corresponding to the target turning angle, and a component of steering reaction force which corresponds to the transient turning reaction force caused due to the asperity of road surface or the like among the turning reaction force detected by the rack axial-force sensor 11 are applied to the steering wheel 1. Accordingly, (a component of) the steering reaction force corresponding to the self aligning torque or the like caused due to the turning angle among the turning reaction force is not applied to the steering wheel 1 so that the driver can be prevented from feeling the restraint on the steering wheel 1.

Figure 10:
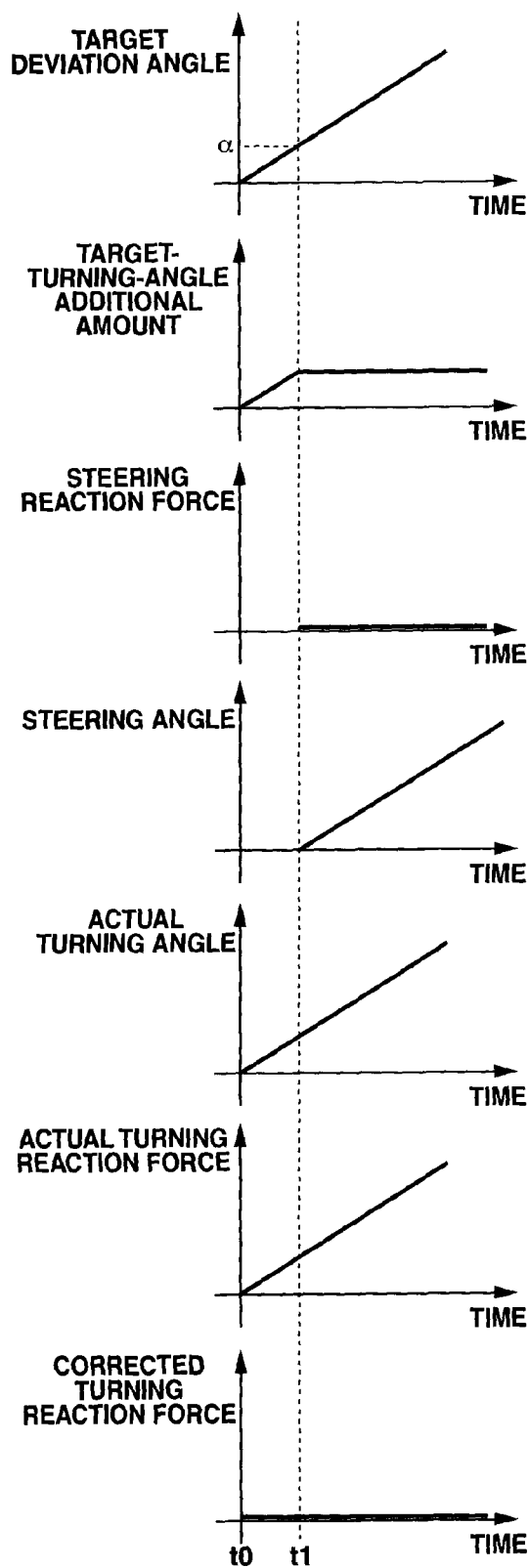
FIG. 10 Time charts of the target-turning-angle additional amount, a steering reaction force, a steering angle, an actual turning angle, an actual turning reaction force and the corrected turning reaction force, in a case that the target deviation angle is made greater with a lapse of time under the automatic turning control.

FIG. 10 are time charts of the target-turning-angle additional amount, the steering reaction force, the steering angle, the actual turning angle, the actual turning reaction force, and the corrected turning reaction force, in a case that the target deviation angle is made greater with the lapse of time under the automatic turning control.

In a region between time point t0 and time point t1, the absolute value of target deviation angle of the automatic turning control is lower than or equal to the value |α|. Hence, the target-turning-angle additional amount proportional to the target deviation angle is added to the target turning angle, so that the actual turning angle of front road-wheels 2, 2 becomes greater with an increase of the target deviation angle.

At this time, although the turning reaction force detected by the rack axial-force sensor 11 becomes greater proportional to an increase of the actual turning angle, the turning reaction-force correcting section 10f subtracts a steady steering reaction force caused due to the self aligning torque or the like, from the detected turning reaction force, as the turning-reaction-force correction value. Moreover at this time, the steering reaction force which is set according to the target turning angle under the is automatic turning control is made to be equal to 0. Hence, the steering reaction force is not generated. Although the mismatch (inconsistency) between the steering angle and the vehicle behavior is generated, the driver does not have the feeling of strangeness because the absolute value of target deviation angle is lower than or equal to the value |α|.

At time point t1, the absolute value of target deviation angle becomes equal to |α|. In a region after time point t1, the target-deviation-angle correcting section 10e produces the target-turning-angle additional amount to be added to the first target turning angle, at the constant value. The steering-reaction-force calculating section 10c produces the steering reaction force according to the actual steering angle and the steering angle set depending on the second target turning angle, namely, produces the steering reaction force according to the target deviation angle, so that the steering wheel 1 is rotated to the steering angle set depending on the second target turning angle. Thereby, the deviation of steering angle relative to the actual turning angle becomes lower than or equal to the predetermined value |α|, and therefore, the feeling of strangeness is not given to the driver.

Moreover, in the region after time point t1, the target turning angle which is calculated by the turning-angle calculating section 10a increases with an increase of the steering angle, and thereby the actual turning angle takes an angle depending on the target turning angle (the second target turning angle) of the automatic turning control. At this time, the turning reaction force detected by the rack axial-force sensor 11 increases proportional to the increase of actual turning angle. However, the turning reaction-force correcting section 10f subtracts a steady turning reaction force such as the self aligning torque from the detected turning reaction force, as the turning-reaction-force correction value. Moreover at this time, the steering reaction force according to the difference between the actual steering angle and the steering angle set depending on the second target turning angle, namely the steering reaction force according to the target deviation angle is generated so that no reaction force is caused at the steering angle set depending on the second target turning angle.

Accordingly, under the automatic turning control; only the deviation between the steering angle according to the target turning angle and the actual steering angle is reflected to the steering reaction force, and the self aligning torque according to the turning angle is not reflected to the steering reaction force. Hence, the driver does not feel that the steering wheel 1 is restrained when the driver tries to steer under the automatic turning control. Moreover, the driver can recognize a variation (increase or decrease) of turning reaction force caused by his manipulation of steering wheel 1, as a steering reaction force of his manipulation.

Moreover, the turning reaction-force correcting section 10f increases the integration gain K as the absolute value of target deviation angle becomes greater, or as the absolute value of variation amount of target deviation angle becomes greater. Thereby, an integration reflection (adaptation) speed of variation amount of the turning reaction force is more increased. That is, when the target deviation angle is large, a neutral position of the turning reaction force is shifted (displaced) quickly, so that a responsivity of the turning of front road-wheels 2, 2 can be enhanced to improve a follow-up capability of vehicle in the automatic turning control.

Moreover, the turning reaction-force correcting section 10f brings the turning-reaction-force correction value gradually to 0, when the automatic turning control has just been turned from ON to OFF. For example, in a case that the turning-reaction-force correction value is rapidly changed to 0 just when the automatic turning control is changed to the normal control, the target steering reaction force which is produced according to the turning reaction force is rapidly increased. This might result in the strangeness feeling of the driver. Therefore in the first embodiment, the turning-reaction-force correction value is made to gradually become equal to 0 by using the time interval "a" which can prevent the driver from having uncomfortable feeling. Thereby, a rapid change of the steering reaction force can be suppressed at the time of return to the normal control.

In the first embodiment, the steering reaction force is not generated when the absolute value of target deviation angle is lower than or equal to the value |α|. However, the configuration according to the present invention is not limited to this. For example, the steering reaction force obtained from the difference between the actual steering angle and the steering angle corresponding to the target turning angle of automatic turning control may be suppressed so as to take a minute value (for example, F×0.1, wherein F is a value of steering reaction force calculated when the absolute value of target deviation angle has just exceeded the value |α| in the first embodiment). Such a reaction force control of steering wheel 1 may be employed so that the strangeness feeling of the driver is avoided.

Next, advantageous effects will now be explained.

The vehicle steering control device in the first embodiment includes the following configurations and advantageous effects.

(1) The steering controller 10 controls the steering reaction force, by defining (using) a value of the steering angle at which the reaction force is equal to 0, as a value of the steering angle set according to the target turning angle (second target turning angle) of automatic turning, under the automatic turning control. Accordingly, the driver does not feel that the steering wheel 1 is restrained.

(2) There is provided the rack axial-force sensor 11 configured to detect the turning reaction force acting on the front road-wheels 2, 2. The steering controller 10 calculates the turning-reaction-force variation-amount integration value by integrating the variation amount of the detected turning reaction force; and controls the reaction-force motor 5 so as to apply a value of the steering reaction force according to the difference between the detected turning reaction force and the calculated turning-reaction-force variation-amount integration value, to the steering wheel 1. Accordingly, the position of steering angle causing no reaction force (the steering angle point at which no reaction force is applied) can be shifted according to the turning reaction force which continues to vary with a lapse of time. Hence, the strangeness feeling of the driver can be more suppressed.

(3) The steering controller 10 fixes the turning-reaction-force variation-amount integration value when a manipulation of the steering wheel is conducted during the automatic turning control. Accordingly, an increase or decrease of turning reaction force according to a steering manipulation-amount of the driver is reflected to the steering reaction force, so that the driver can directly recognize the increase or decrease of turning reaction force caused by the manipulation of steering wheel.

(4) The steering controller 10 increases the integration reflection speed of variation amount of turning reaction force as the target turning angle (second target turning angle) for the automatic turning control becomes greater. Accordingly, the follow-up performance of vehicle at the time of automatic turning control is improved. That is, a tracing capability of the vehicle toward a target path can be enhanced.

(5) The steering controller 10 controls the reaction-force motor 5 so as to apply the steering reaction force in accordance with the difference between the actual steering angle and a value of steering angle set according to the target turning angle (second target turning angle) under the automatic turning control. Accordingly, a force for rotating the steering wheel 1 up to a point of the steering angle value set according to the target turning angle can be applied to the steering wheel 1.

(6) The steering controller 10 returns the minimum reaction-force position (value of steering angle at which the reaction force is equal to 0), gradually to the value of steering angle at the time of straight running of vehicle (a neutral position of the steering wheel), when the automatic turning control is released. Accordingly, the automatic turning control can be changed back to the normal control without the feeling of strangeness when the automatic turning control is released.

Second Embodiment

In a second embodiment according to the present invention, the steering reaction force is produced according to the target turning angle.

A schematic configuration of the second embodiment is similar as that of the first embodiment shown in FIG. 1. Hence, explanations and diagrammatic representations thereof will be omitted.

Figure 11:
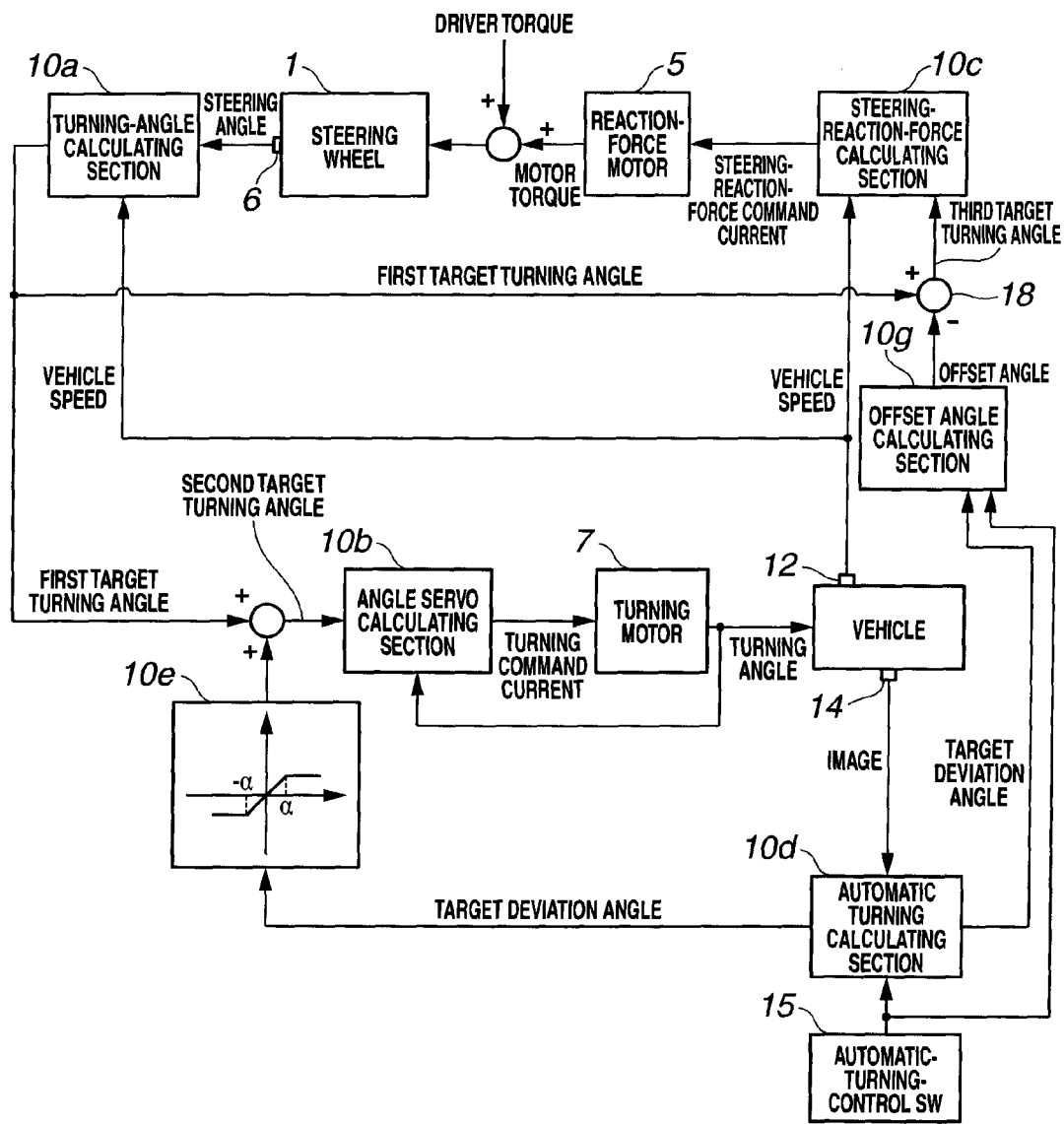
FIG. 11 A control block diagram of a steering controller 10 in a second embodiment.

FIG. 11 is a control block diagram of a steering controller 10 in the second embodiment. In the second embodiment, there is provided an offset angle calculating section 10g instead of the turning reaction-force correcting section 10f of the first embodiment shown in FIG. 3.

A steering-reaction-force calculating section 10c in the second embodiment calculates the target steering reaction force by use of the following formula when the absolute value of target deviation angle calculated by the automatic turning calculating section 10d is greater than the value |α|.

Figure 12:
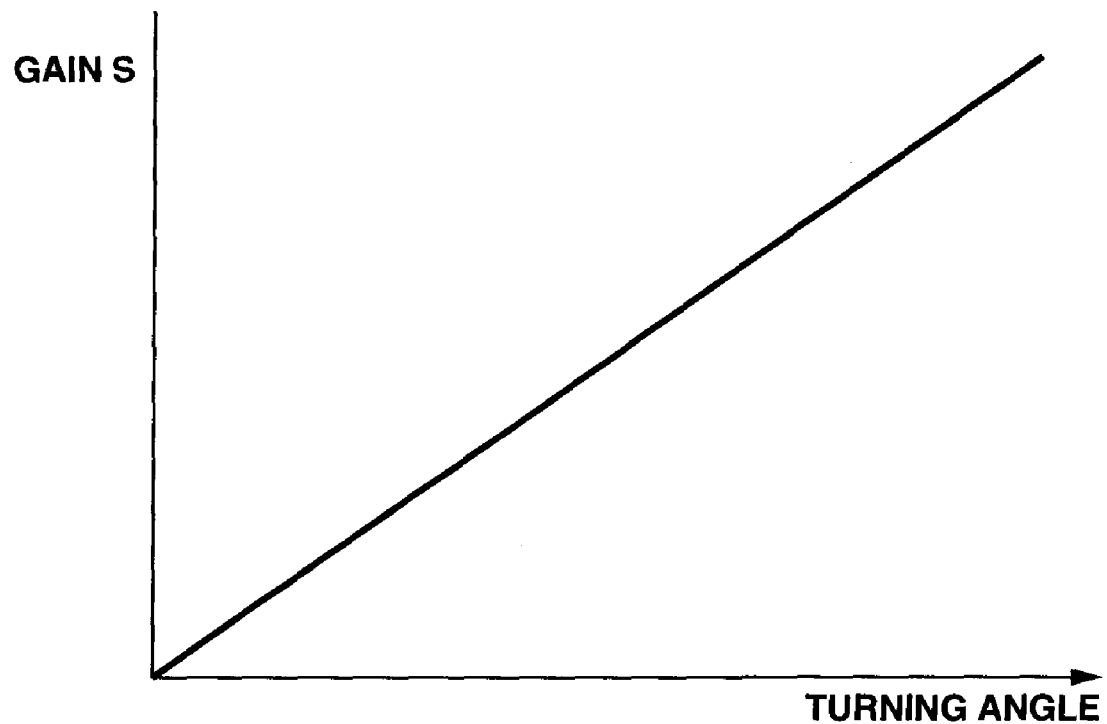
FIG. 12 A setting map for a gain S in the second embodiment.

Target Steering Reaction Force=−S×Third Target Turning Angle

Wherein the third target turning angle is obtained by subtracting an offset angle from the first target turning angle. This offset angle is outputted by the offset angle calculating section 10g. Moreover, S denotes a gain and is calculated referring to a gain map shown in FIG. 12. This gain S is set in advance by calculating a characteristic of road-surface reaction force relative to the turning angle through experiments or the like, according to a vehicle to which this embodiment is applied.

The offset angle calculating section 10g outputs the offset angle according to the target deviation angle, when the absolute value of target deviation angle calculated by the automatic turning calculating section 10d is greater than the value |α|. A value obtained by subtracting the outputted offset angle from the first target turning angle is inputted to the steering-reaction-force calculating section 10c as the third target turning angle. On the other hand, when the absolute value of target deviation angle is lower than or equal to the value |α|, the offset angle is set at 0.

Moreover, the offset angle calculating section 10g maintains its integration value under the normal control, by setting an integration gain N at 0 (N=0).

In an inside of an after-mentioned integrator 17c of offset angle calculating section 10g, there is provided a function block for gradually reducing the turning-reaction-force correction value when the automatic turning control is turned OFF as shown in FIG. 8.

Figure 13:
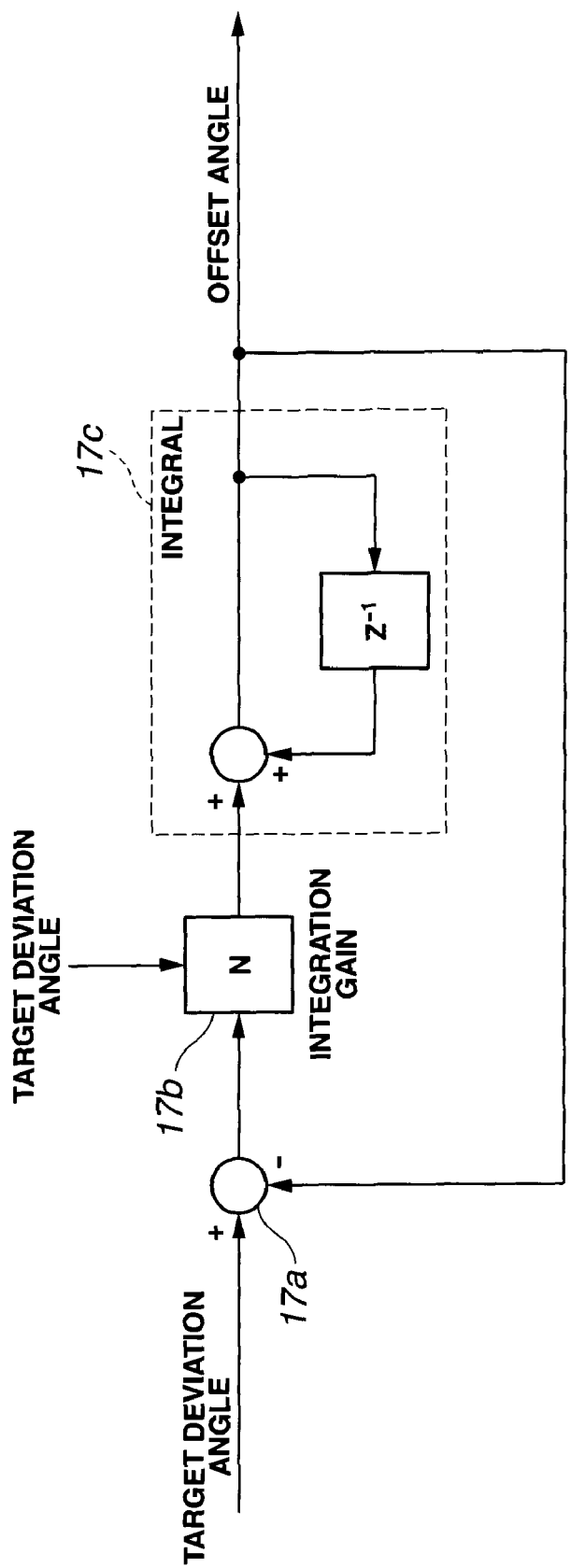
FIG. 13 A control block diagram of an offset angle calculating section 10g in the second embodiment.

FIG. 13 is a control block diagram of the offset angle calculating section 10g. The offset angle calculating section 10g includes a subtractor (difference calculator) 17a, a multiplier 17b and the integrator 17c.

The subtractor 17a outputs a difference between the calculated target deviation angle and the offset angle outputted from the integrator 17c, to the multiplier 17b.

The multiplier 17b multiplies this difference by the integration gain N, and outputs this multiplication value to the integrator 17c. The integration gain N is a value capable of securing a responsivity of vehicle relative to the target deviation angle, and has been calculated in advance through experiments or the like.

The integrator 17c outputs the offset angle obtained by integrating the output of multiplier 17b, to a subtractor (difference calculator) 18.

Next, operations will now be explained.

In the second embodiment, when the absolute value of target deviation angle is lower than or equal to the value

|α|, the first target turning angle calculated by the turning-angle calculating section 10a is inputted to the steering-reaction-force calculating section 10c as it is. Hence, the front road-wheels 2, 2 can be turned according to the target deviation angle, without applying a steering reaction force according to the target deviation angle to the steering wheel 1.

On the other hand, when the absolute value of target deviation angle is greater than the value |α|; the offset angle is subtracted from the first target turning angle calculated by the turning-angle calculating section 10a, and then this subtraction result is inputted to the steering-reaction-force calculating section 10c as the third target turning angle. The third target turning angle is the value which is obtained by subtracting the offset angle obtained by integrating the target deviation angle, from the first target turning angle. Hence, in a steady state, the third target turning angle is a value obtained by reversing the target deviation angle in sign (positive/negative). That is, when the absolute value of target deviation angle is greater than the value |α|; the steering-reaction-force calculating section 10c produces the steering reaction force on the basis of the target deviation angle, so that a value of steering angle set depending on the second target turning angle is the point of steering angle at which the reaction force becomes equal to 0 (i.e., functions as the steering angle point at which no reaction force is applied), in the same manner as the first embodiment. Thus, the steering reaction force is generated according to the difference between the actual steering angle and the point of steering angle set depending on the second target turning angle.

Therefore, the steering control device for a vehicle in the second embodiment can obtain operations and advantageous effects similar as those (1), (5) and (6) of the first embodiment.

Third Embodiment

In a third embodiment according to the present invention, a variation of the turning reaction force which has a frequency greater than or equal to a predetermined frequency value is reflected to the steering reaction force. A schematic configuration of the third embodiment is similar as that of the first embodiment shown in FIG. 1. Hence, explanations and diagrammatic representations thereof will be omitted.

Figure 14:
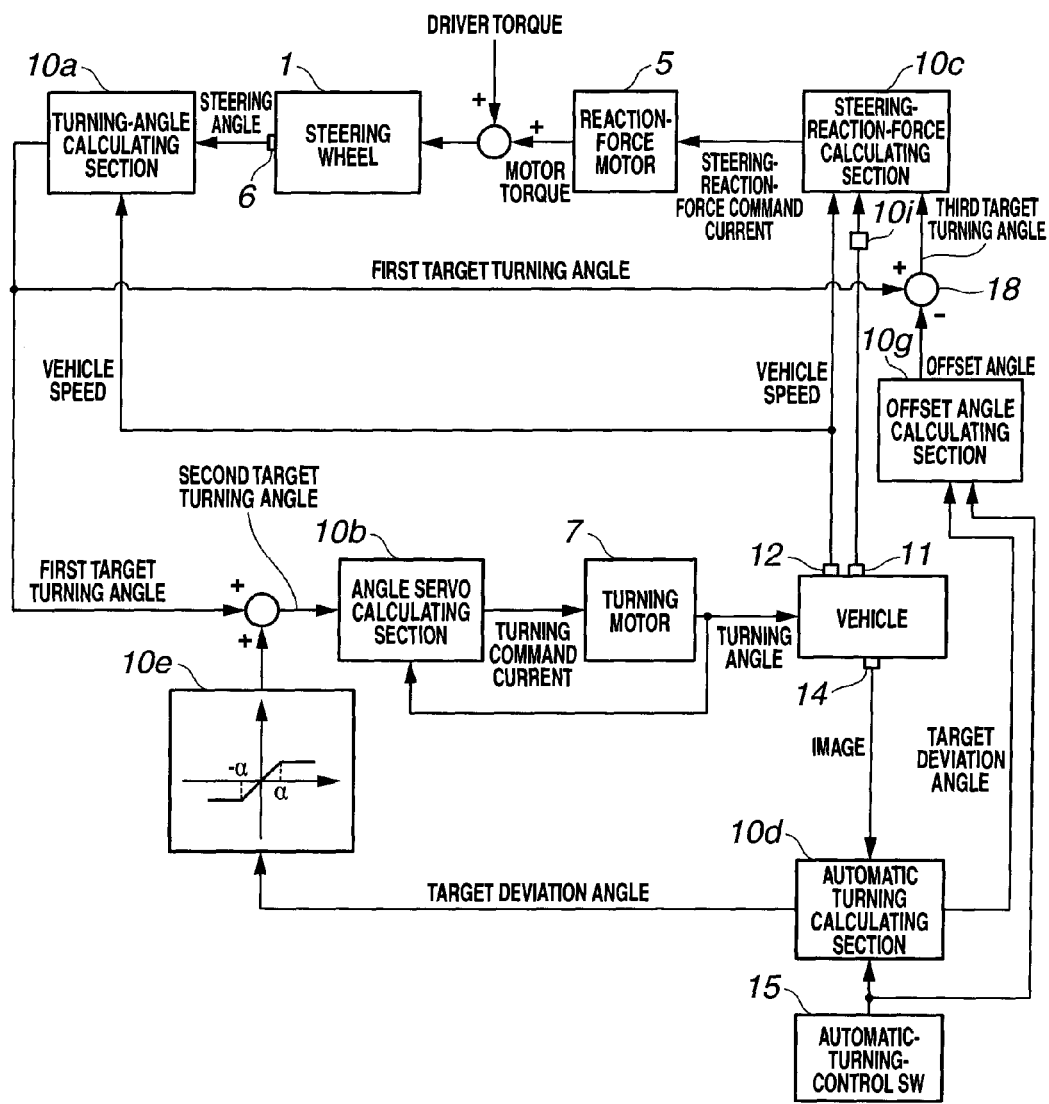
FIG. 14 A control block diagram of a steering controller 10 in a third embodiment.

FIG. 14 is a control block diagram of a steering controller 10 in the third embodiment. In the third embodiment, there is provided a rack axial-force sensor 11 and a high-pass filter 10i in addition to the configuration of the second embodiment shown in FIG. 11.

In the third embodiment, the turning reaction force derived from the rack axial-force sensor 11 is inputted through the high-pass filter 10i to a steering-reaction-force calculating section 10c. This high-pass filter 10i passes a component of the turning reaction force which is higher than the predetermined frequency (cutoff frequency), and does not pass (attenuates) a component of the turning reaction force which is lower than the predetermined frequency (cutoff frequency).

The predetermined frequency of high-pass filter 10i is higher than a frequency of turning reaction force which is detected when the vehicle is running on a flat road, and is lower than or equal to a frequency of turning reaction force which is detected when the vehicle is passing through a rough road such as gravel road or a puddle.

The steering-reaction-force calculating section 10c in the third embodiment calculates the target steering reaction force in accordance with a value of steering reaction force depending on the third target turning angle and a value of steering reaction force according to a variation of the turning reaction force, when the absolute value of target deviation angle calculated by the automatic turning calculating section 10d is greater than the value |α|.

Target Steering Reaction Force=−K×Third Target Turning Angle+Turning Reaction Force obtained through High-pass Filter Wherein K denotes a gain. This gain K is set in advance by calculating a characteristic of road-surface reaction force relative to the turning angle through experiments or the like, according to a vehicle to which this embodiment is applied, in the same manner as the second embodiment.

Next, operations will now be explained.

In the third embodiment, the steering-reaction-force calculating section 10c produces the target steering reaction force on the basis of the turning reaction force which has passed through the high-pass filter. Accordingly, the variation of turning reaction force which has a frequency value(s) higher than or equal to the predetermined frequency can be reflected to (can influence) the steering reaction force. Therefore, a road-surface condition such as gravel road or puddle can be reflected to the steering reaction force.

Next, advantageous effects will now be explained.

The steering control device for a vehicle in the third embodiment includes the following configurations and advantageous effects in addition to the effects (1), (5) and (6) of the first embodiment.

(7) There is provided the rack axial-force sensor 11 configured to detect the turning reaction force acting on the front road-wheels 2, 2. The steering controller 10 controls the reaction-force motor 5 so as to apply the steering reaction force in accordance with a frequency component of the detected turning reaction force, in the case where this frequency component is higher than or equal to the predetermined frequency. Accordingly, under the automatic turning control, the driver can recognizes the road-surface condition such as gravel road or puddle, as the steering reaction force.

Fourth Embodiment

In a fourth embodiment according to the present invention, the steering reaction force is produced in accordance with the actual turning angle instead of the first target turning angle of the second and third embodiments.

A schematic configuration of the fourth embodiment is similar as that of the first embodiment shown in FIG. 1. Hence, explanations and diagrammatic representations thereof will be omitted.

Figure 15:
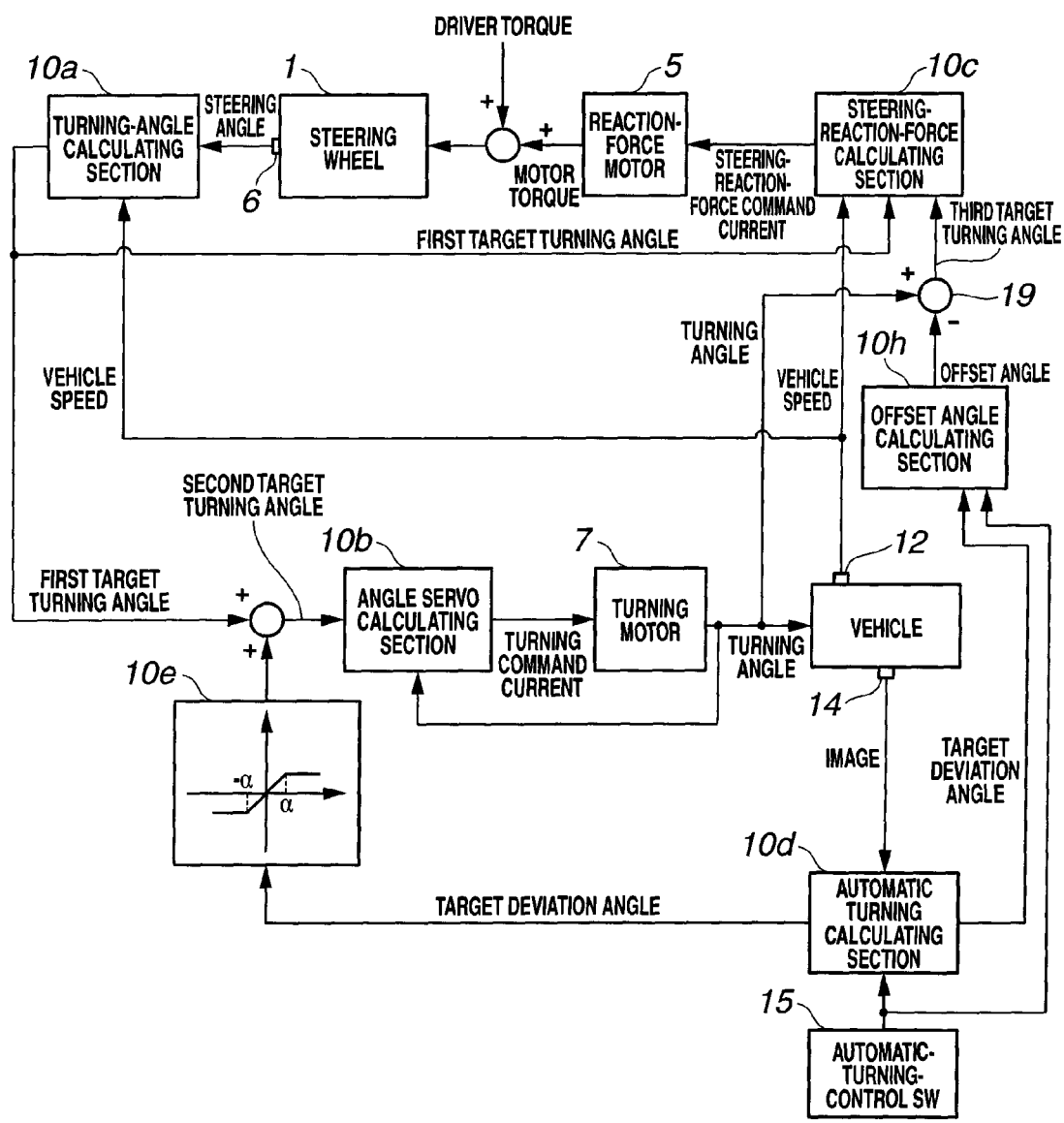
FIG. 15 A control block diagram of a steering controller 10 in a fourth embodiment.

FIG. 15 is a control block diagram of a steering controller 10 in the fourth embodiment. In the fourth embodiment, there is provided an offset angle calculating section 10h instead of the offset angle calculating section 10g of the second embodiment.

A steering-reaction-force calculating section 10c in the fourth embodiment calculates the target steering reaction force by use of the following formula, when the absolute value of target deviation angle calculated by the automatic turning calculating section 10d is greater than the value |α|.

Target Steering Reaction Force=−S×Actual Turning Angle

Wherein S denotes a gain. This gain S is set in advance by calculating a characteristic of road-surface reaction force relative to the turning angle through experiments or the like, according to a vehicle to which this embodiment is applied, in the same manner as the second embodiment.

When the absolute value of target deviation angle of automatic turning control calculated by the automatic turning calculating section 10d is greater than the value |α|, the offset angle calculating section 10h gives an offset angle according to the target deviation angle to the actual turning angle, and thereby shifts the point of steering angle at which the reaction force becomes 0. On the other hand, when the absolute value of target deviation angle is lower than or equal to the value |α|, the offset angle calculating section 10h sets the offset angle at 0 so that the point of steering angle at which the reaction force becomes 0 is not shifted.

Moreover, the offset angle calculating section 10h maintains its integration value under the normal control, by setting an integration gain M at 0 (M=0).

In an inside of offset angle calculating section 10h, there is provided a function block for gradually reducing the turning-reaction-force correction value when the automatic turning control is turned OFF as shown in FIG. 8.

Figure 16:
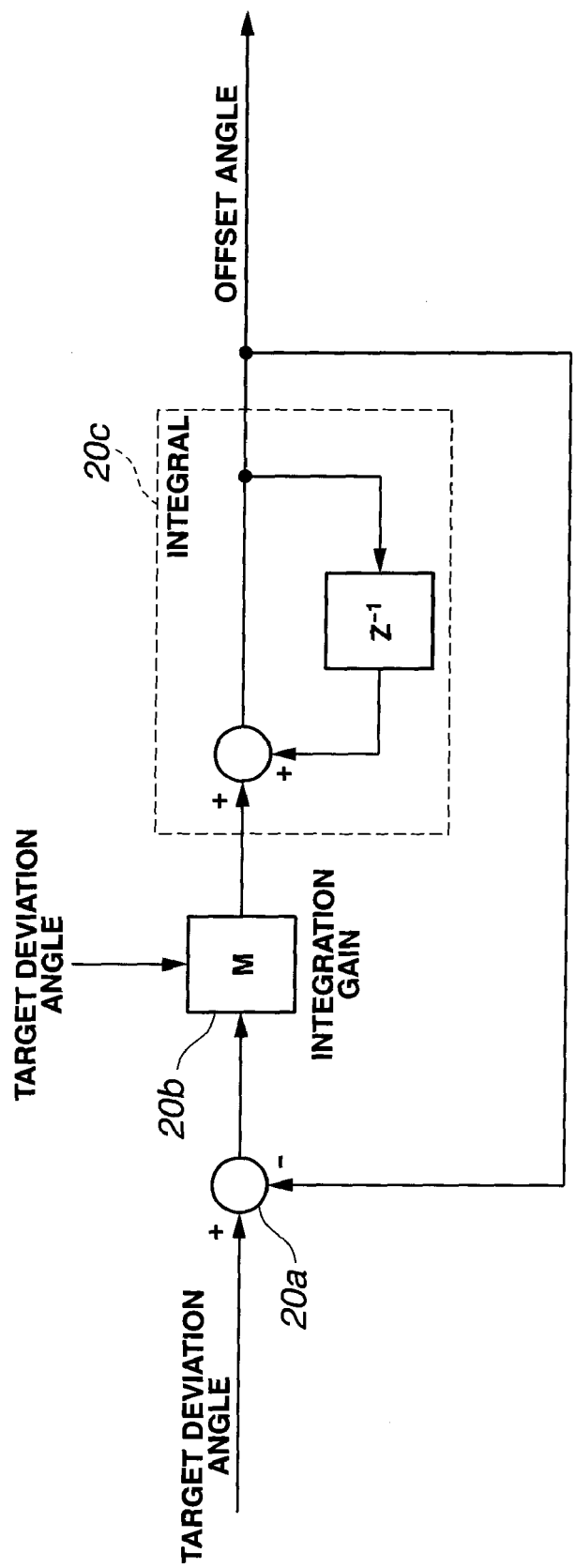
FIG. 16 A control block diagram of an offset angle calculating section 10h in the fourth embodiment.

FIG. 16 is a control block diagram of the offset angle calculating section 10h. The offset angle calculating section 10h includes a subtractor 20a, a multiplier 20b and an integrator 20c.

The subtractor 20a outputs a difference between the calculated target deviation angle and the offset angle outputted from the integrator 20c, to the multiplier 20b.

The multiplier 20b multiplies this difference by the integration gain M, and outputs this multiplication value to the integrator 20c. The integration gain M is a value capable of securing a responsivity of vehicle relative to the target deviation angle, and has been calculated in advance through experiments or the like.

The integrator 20c outputs the offset angle obtained by integrating the output of multiplier 20b, to a subtractor 19.

Next, operations will now be explained.

In the fourth embodiment, when the absolute value of target deviation angle is lower than or equal to the value |α|, the actual turning angle is inputted to the steering-reaction-force calculating section 10c as it is. Hence, the front road-wheels 2, 2 can be turned according to the target deviation angle, without applying a reaction force according to the target deviation angle to the steering wheel 1.

On the other hand, when the absolute value of target deviation angle is greater than the value |α|; the actual turning angle is corrected by the offset angle, and then this correction result is inputted to the steering-reaction-force calculating section 10c. Accordingly, the value of steering angle set according to the target turning angle (second target turning angle) at the time of automatic turning control forms (can define) the point of steering angle at which no reaction force is applied. Then, the steering reaction force is generated according to the difference between the value of steering angle set depending on the target turning angle and the actual steering angle, if the driver conducts a steering manipulation.

Therefore, the steering control device for a vehicle in the fourth embodiment can obtain operations and advantageous effects similar as those (1), (5) and (6) of the first embodiment.

(Other Embodiments)

Although the best mode for carrying out the present invention has been described above with reference to the respective embodiments, a concrete configuration according to the present invention is not limited to the embodiments. Design modifications of the respective embodiments or the like without departing from the scope of the present invention will occur to those skilled in the art in light of teachings of the present invention.

In the second and third embodiments, the example has been described in which the target steering reaction force is produced based on the target turning angle. In the fourth embodiment, the example has been described in which the target steering reaction force is produced based on the actual turning angle. However according to the present invention, the target steering reaction force may be produced by using both of the target turning angle and actual turning angle by combining the fourth embodiment with the second or third embodiment. In this case, under the automatic turning control, the operations and effects similar as the second to fourth embodiments can be obtained by shifting the neutral position with reference to each of a component of steering reaction force according to the target turning angle and a component of steering reaction force according to the actual turning angle.

The invention claimed is:

1. A vehicle steering control device:
   wherein a steering wheel is mechanically disconnected from a turning mechanism for turning a steering road-wheel;
   configured to perform a normal control for controlling a turning angle of the steering road-wheel on the basis of a first target turning angle set according to a steering angle of the steering wheel;
   configured to perform an automatic turning control for controlling the turning angle of the steering road-wheel irrespective of a driver's manipulation of the steering wheel on the basis of a second target turning angle set according to a running state of a vehicle; and
   wherein the vehicle steering control device comprises a reaction-force control section configured to control a steering reaction force to be applied to the steering wheel, by defining a value of the steering angle at which the steering reaction force is equal to 0, as a value of the steering angle at a time of straight running of the vehicle, under the normal control, and to control the steering reaction force, by defining a value of the steering angle set according to the second target turning angle, as the value of the steering angle at which the steering reaction force is equal to 0, under the automatic turning control.

2. The vehicle steering control device as claimed in claim 1, wherein
   the vehicle steering control device comprises a turning reaction-force detecting section configured to detect a turning reaction force acting on the steering road-wheel; and
   the reaction-force control section is configured
   to calculate a turning-reaction-force variation-amount integration value by integrating a variation amount of the detected turning reaction force, and
   to apply a value of the steering reaction force resulting from a sum of a first value of the steering reaction force and a second value of the steering reaction force, to the steering wheel under the automatic turning control, wherein the first value is obtained according to a difference between the detected turning reaction force and the calculated turning-reaction-force variation-amount integration value, wherein the second value is obtained based on a difference between an actual steering angle and the value of the steering angle set according to the second target turning angle.

3. The vehicle steering control device as claimed in claim 2, wherein the reaction-force control section is configured to fix the turning-reaction-force variation-amount integration value when a manipulation of the steering wheel is conducted under the automatic turning control.

4. The vehicle steering control device as claimed in claim 2, wherein
the reaction-force control section is configured to increase an integration speed of the variation amount of the turning reaction force as a target deviation angle becomes greater, wherein the target deviation angle is a difference between the first target turning angle and the second target turning angle.

5. The vehicle steering control device as claimed in claim wherein
the reaction-force control section is configured to apply the steering reaction force in accordance with a difference between an actual steering angle and the value of the steering angle set according to the second target turning angle, under the automatic turning control.

6. The vehicle steering control device as claimed in claim 5, wherein
the vehicle steering control device comprises a turning reaction-force detecting section configured to detect a turning reaction force acting on the steering road-wheel; and
the reaction-force control section is configured to apply the steering reaction force in accordance with a frequency component of the detected turning reaction force, wherein the frequency component is higher than or equal to a predetermined frequency.

7. The vehicle steering control device as claimed in claim 1, wherein
the reaction-force control section is configured to gradually return the value of the steering angle at which the steering reaction force is equal to 0, to the value of the steering angle at the time of straight running of the vehicle, when the automatic turning control is released.

8. A vehicle steering control method comprising:
performing a normal control for controlling a turning angle of a steering road-wheel on the basis of a first target turning angle set according to a steering angle of a steering wheel, wherein the steering wheel is mechanically disconnected from a. turning mechanism for turning the steering road-wheel;
performing an automatic turning control for controlling the turning angle of the steering road-wheel irrespective of a driver's manipulation of the steering wheel on the basis of a second target turning angle set according to a running state of vehicle;
controlling a steering reaction force to be applied to the steering wheel, by defining a value of the steering angle at, which the steering reaction force is equal to 0, as a value of the steering angle obtained at a time of straight running of the vehicle, under the normal control; and
controlling the steering reaction force, by defining a value of the steering angle set according to the second target turning angle, as the value of the steering angle at which the steering reaction force is equal to 0, under the automatic turning control.

* * * * *